(12) United States Patent
Parron et al.

(10) Patent No.: US 10,164,871 B2
(45) Date of Patent: Dec. 25, 2018

(54) METHODS AND DEVICES FOR MULTI-DEVICE LINK AGGREGATION

(71) Applicant: Intel IP Corporation, Santa Clara, CA (US)

(72) Inventors: Jerome Parron, Fuerth (DE); Martin Kolde, Munich (DE)

(73) Assignee: Intel IP Corporation, Santa Clara, CA (US)

( * ) Notice: Subject to any disclaimer, the term of this patent is extended or adjusted under 35 U.S.C. 154(b) by 182 days.

(21) Appl. No.: 14/670,967

(22) Filed: Mar. 27, 2015

(65) Prior Publication Data

US 2016/0285746 A1   Sep. 29, 2016

(51) Int. Cl.
*H04L 12/709* (2013.01)
*H04L 29/12* (2006.01)
*H04W 4/00* (2018.01)
*H04W 4/80* (2018.01)

(52) U.S. Cl.
CPC ............. *H04L 45/245* (2013.01); *H04W 4/80* (2018.02); *H04L 61/2007* (2013.01); *H04L 61/303* (2013.01); *H04L 61/3075* (2013.01)

(58) Field of Classification Search
CPC ......................... H04L 45/245; H04L 61/3075
See application file for complete search history.

(56) References Cited

U.S. PATENT DOCUMENTS

| | | |
|---|---|---|
| 2006/0045069 A1 | 3/2006 | Zehavi et al. |
| 2010/0039993 A1 | 2/2010 | Ramankutty et al. |
| 2011/0040888 A1 | 2/2011 | Krishnaswamy et al. |
| 2012/0106456 A1 | 5/2012 | Jin et al. |

(Continued)

FOREIGN PATENT DOCUMENTS

| | | |
|---|---|---|
| TW | 201642624 A | 12/2016 |
| TW | I610547 B | 1/2018 |
| WO | WO-2016160203 A1 | 10/2016 |

OTHER PUBLICATIONS

"International Application Serial No. PCT/US2016/019718, International Search Report dated Jul. 8, 2016", 5 pgs.
"International Application Serial No. PCT/US2016/019718, Written Opinion dated Jul. 8, 2016", 12 pgs.
"Taiwanese Application Serial No. 105105509, Office Action dated May 18, 2017", W/ English Translation, 26 pgs.

(Continued)

*Primary Examiner* — Yemane Mesfin
*Assistant Examiner* — Henry Baron
(74) *Attorney, Agent, or Firm* — Schwegman Lundberg & Woessner, P.A.

(57) ABSTRACT

Embodiments pertain to methods and devices for multi-device link aggregation. Embodiments may implement shared packet data network (PDN) connections to enable an application on a host UE to both create a first connection to a PDN gateway and to create a second connection to the PDN via a second UE. In one example embodiment, a UE includes flow routing circuitry configured to communicate data traffic via multiple different communication paths as part of the shared PDN connection to a PDN gateway. A cellular modem of the UE is configured to communicate a first portion of the data traffic with the PDN gateway as part of the shared PDN connection. Connectivity circuitry of the UE separate from the cellular modem is configured to communicate a second portion of the data traffic with the PDN gateway via a second UE, wherein the second portion of the data traffic is different than the first portion of the data traffic.

27 Claims, 14 Drawing Sheets

(56) References Cited

U.S. PATENT DOCUMENTS

| | | | |
|---|---|---|---|
| 2013/0157659 A1* | 6/2013 | Ikeda | H04W 12/08 |
| | | | 455/435.1 |
| 2014/0051443 A1 | 2/2014 | Diachina et al. | |
| 2014/0293882 A1 | 10/2014 | Choi et al. | |
| 2014/0348130 A1 | 11/2014 | Kaippallimalil et al. | |
| 2015/0003314 A1 | 1/2015 | Kim et al. | |
| 2015/0003466 A1* | 1/2015 | Soffer | H04L 47/34 |
| | | | 370/412 |
| 2015/0271169 A1* | 9/2015 | Seligson | H04L 63/0892 |
| | | | 726/4 |
| 2015/0312788 A1* | 10/2015 | Delsol | H04W 84/047 |
| | | | 370/252 |
| 2015/0327045 A1* | 11/2015 | Chang | H04W 8/005 |
| | | | 370/329 |
| 2016/0119826 A1* | 4/2016 | Huh | H04W 76/025 |
| | | | 370/332 |
| 2016/0262144 A1* | 9/2016 | Kitazoe | H04L 5/0057 |

OTHER PUBLICATIONS

"International Application Serial No. PCT/US2016/019718, International Preliminary Report on Patentability dated Oct. 12, 2017", 12 pgs.

"Taiwanese Application Serial No. 105105509, Response filed Aug. 15, 2017 to Office Action dated May 18, 2017", w/ claims in English, 20 pgs.

* cited by examiner

METHODS AND DEVICES FOR MULTI-DEVICE LINK AGGREGATION

TECHNICAL FIELD

Some embodiments pertain to systems, methods, and devices associated with wireless communications and the use of multiple devices to provide link aggregation to an endpoint. Some embodiments pertain to user equipment (UE) functionality related to multi-device link aggregation. Some embodiments relate to cellular network elements such as packet data network (PDN) gateways which may be used for multi-device link aggregation.

BACKGROUND

Wireless mobile communication technology uses various standards and protocols to transmit data between a base transceiver station or evolved universal mobile telecommunications system terrestrial radio access node B (eNB) and a wireless mobile device or user equipment (UE). Some devices may include multiple types of communication circuitry, such as a cellular modem and separate Wi-Fi circuitry which may be used for different wireless communication operations.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
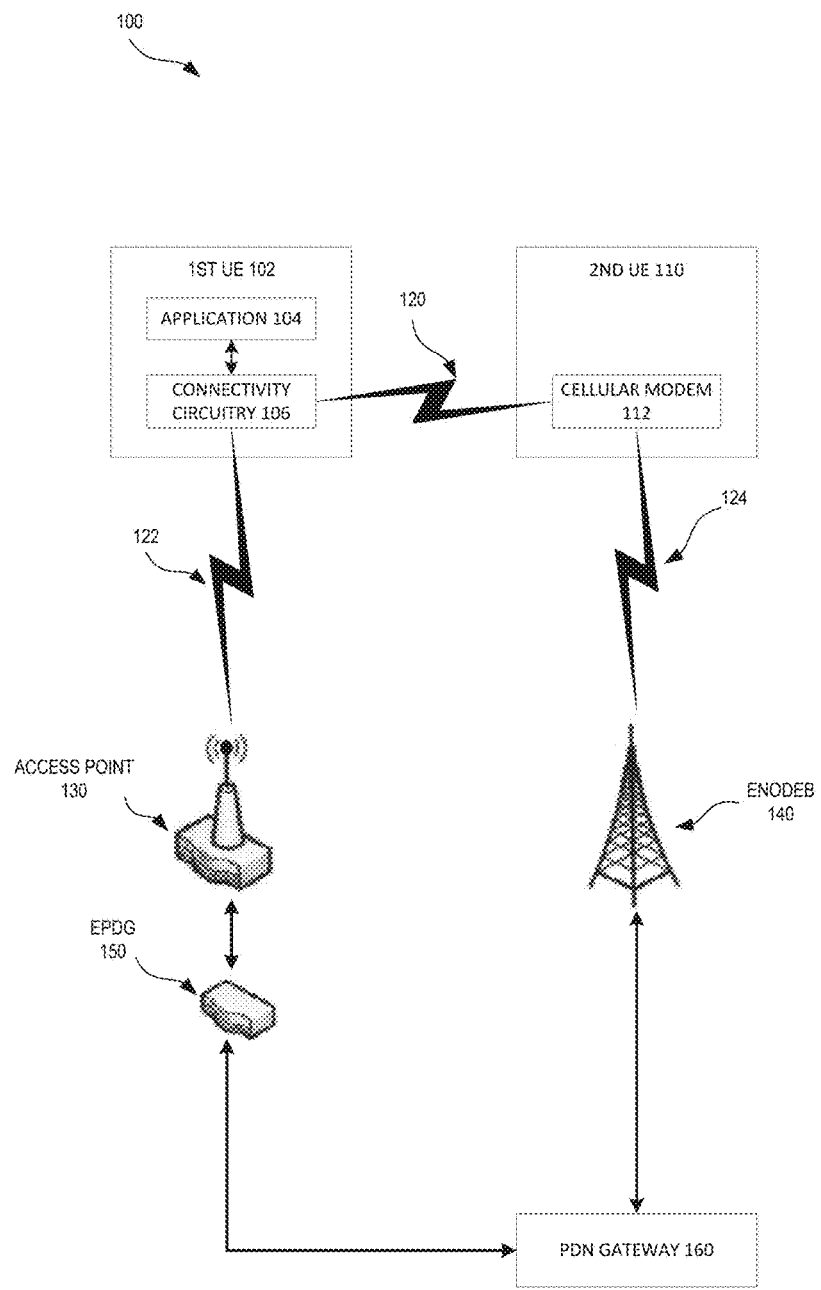
FIG. 1 illustrates a block diagram of a network which may be used in accordance with some example embodiments.

FIG. 1 illustrates a block diagram of a network 100 which may be used in accordance with some example embodiments. The network 100 includes first user equipment (UE) 102 and second UE 110. The UEs 102 and 110 may be, for example, laptop computers, smart phones, tablet computers, printers, wearable devices, machine-type devices such as smart meters or networked appliances, or any other wireless device with or without a user interface. The UEs 102 and 110 have a wireless connection via air interfaces 122 and 124 to a networking element.

As illustrated, the example embodiment of network 100 shows connectivity circuitry 106 of the first UE 102 connecting to access point 130 via air interface 122. Access to a broader network such as the Internet is provided via a connection from access point 130 to packet data network (PDN) gateway 160 via evolved packet data gateway (ePDG) 150. PDN gateway 160 is a network element that acts as a point of connectivity between a UE in a system and external packet data networks, which may be any network including the Internet. EPDG 150 manages data from network entry points, such as access point 130, that are not trusted or that may be insecure or have uncertain security characteristics in some way. In alternate embodiments where access point 130 is trusted, this ePDG 150 may alternately be a trusted wireless LAN access gateway (TWAG).

Cellular modem 112 of the second UE 110 connects to access node B (eNB) 140 via air interface 124. ENB 140 then connects to the same PDN gateway 160. Further, the first UE 102 connects to the second UE 110 via air interface 120. In other embodiments, the first UE 102 may connect to the second UE via a wired connection. The connection between the first UE 102 and the second UE 110 may use any communication circuitry of the UEs 102 and 110 which is capable of connecting such devices. This may include Bluetooth connections, near field connections, local area network (LAN) connections including wireless LAN (WLAN) Wi-Fi connections which may be direct or via an access point 130, or any other such wireless connectivity between UEs 102 and 110.

Application 104 operating on the first UE 102 may be any application that uses network data. As illustrated by network 100, application 104 has two network paths available from application 104 to PDN gateway 160. Embodiments described herein enable one or more applications 104 of the first UE 102 to use both of these paths as a network resource. For example, if bandwidth available via the connection through air interface 122 to PDN gateway 160 has a limit of A, bandwidth available via the connection through air interfaces 120 and 124 to PDN gateway 160 has a limit of B, and application 104 operating on the first UE 102 is capable of using bandwidth greater than A or B, then embodiments enable the use of both communication paths at the same time to allow greater network resources to be used by a single device. Such embodiments provide a benefit when the communication path between the first UE 102 and the PDN gateway 160 is the limitation on network performance, and not when local data processing on the first UE 102 or any resource at or beyond PDN gateway 160 is a limiting factor of network performance.

Figure 2:
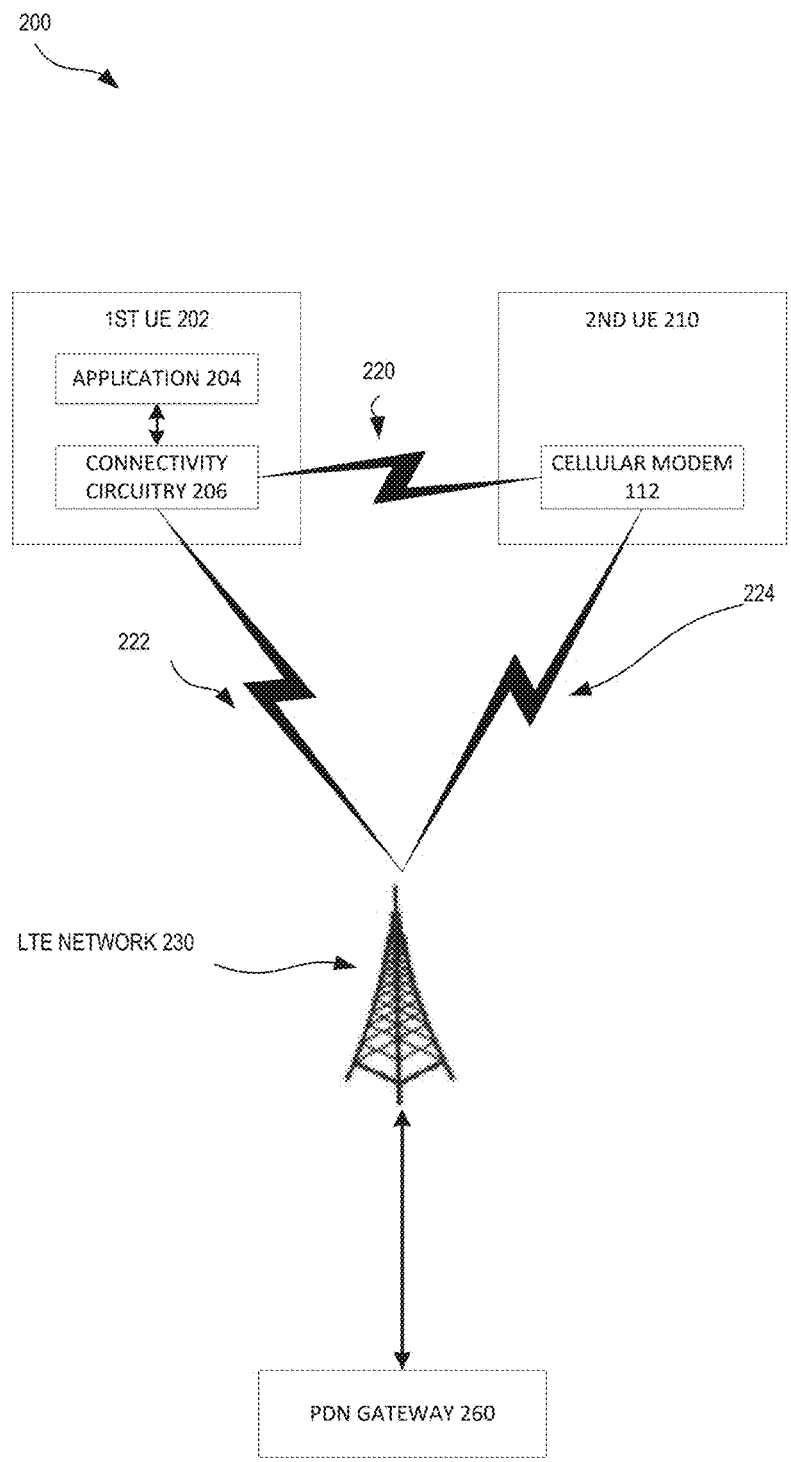
FIG. 2 illustrates a block diagram of a network which may be used in accordance with some example embodiments.
Figure 3:
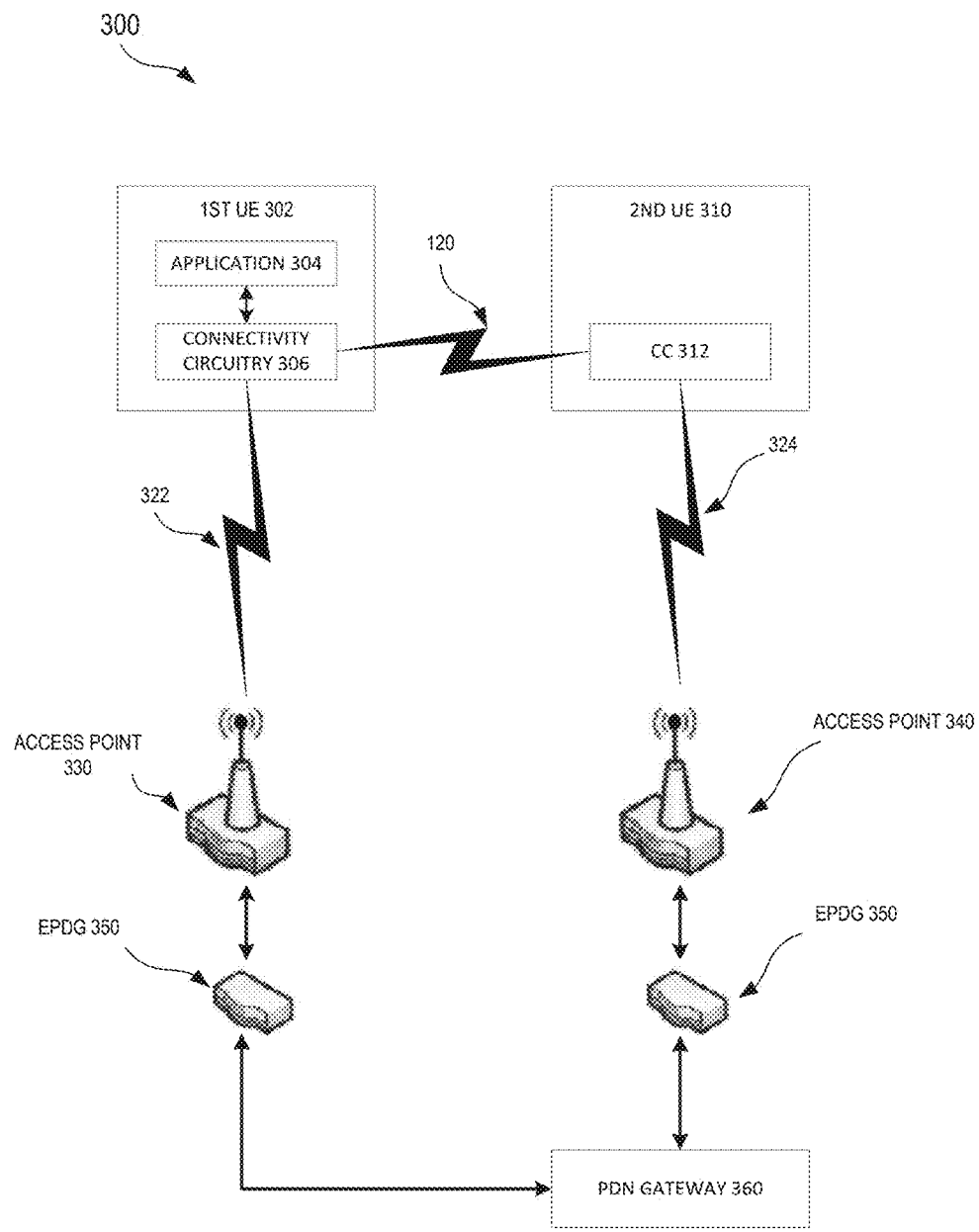
FIG. 3 illustrates a block diagram of a network which may be used in accordance with some example embodiments.

FIGS. 2 and 3 then show alternate embodiments of networks that may be used for multi-device link aggregation. FIG. 2 illustrates a block diagram of a network 200 which may be used in accordance with some example embodiments. Similar to network 100, network 200 includes a first UE 202 and a second UE 210 which are connected together by air interface 220, and where each UE has a separate connection to a PDN gateway 260. In network 200, however, each UE has a cellular modem 112, shown as LTE modem 206 and LTE modem 212, respectively. These cellular modems 112 enable connection of the first UE 202 to long term evolution (LTE) network 230 or an LTE Advanced (LTE-A) network via air interface 222, and connection of the second UE 210 to the LTE network 230 via air interface 224. In various embodiments, such cellular modems 112 and cellular networks may be LTE-advanced instead of LTE, or may be any other such cellular system. LTE network 230 uses PDN gateway 260 to connect to a broader network, such as the Internet. According to various embodiments, application 204 operating on the first UE 202 uses both the network connection via air interface 222 as well as the network connection via air interfaces 220 and 224 to provide greater resource availability than would be provided by only one of these connections.

LTE modems 206, 212 are being integrated in more and more different devices such as smart phones, tablets, and notebook devices. In many environments, a single user may have multiple such devices which each have an LTE modem 206, 212. Embodiments described herein enable applications 204 on a single device to benefit from the total transmission capability of multiple user devices. As described herein, two or more distinct devices combine their data transmission capability to improve user experience and global data throughput provided to a device being operated by a user. This collaborative use may, in different devices, serve one or more shared user applications that need to exchange data with the network. The traffic exchanged between the user applications and a remote is split at the UE 202 operating the application 204 in order to be communicated over multiple links handled by the multiple devices. In certain embodiments, this multi-link aggregation is transparent to applications 204 and high-level services, so that the end user of the data is not aware of the data splitting and multi-device link aggregation.

Certain embodiments therefore introduce the sharing of a PDN connection between multiple links handled by multiple devices. A PDN connection is anchored in a PDN gateway 260 which is accessible through various links using either third generation partnership project (3GPP) standard access, non-3GPP access, or both. A PDN connection shared between multiple devices can, in various embodiments, be simultaneously used by multiple devices in the system. In some embodiments, this data splitting and aggregation of traffic is performed between the IP layer and layer 2 of the respective link in various embodiments described herein. In other embodiments, these operations may be performed as part of layer 2.

Embodiments described herein therefore provide multiple technical advantages, including network architectures for aggregating links from different devices, enabling of multiple devices having separate links to access a common network to share a PDN connection, and enabling a network to perform load-balancing or flow control between different links from different devices sharing a PDN connection. These technical advantages may be provided for both 3GPP access such as LTE or LTE-advanced, and may additionally be provided for non-3GPP access such as an S2B (as defined by 3GPP standards) interface over Wi-Fi. Such technical advantages may additionally be combined with technologies such as layer to bridging, multi-link virtual private networks, or other such technologies which deal with the aggregation of multiple links on a single device. Embodiments described herein may be integrated with such technologies to provide, for example, three or more network connections from two devices.

Similar to FIGS. 1 and 2, FIG. 3 illustrates a block diagram of a network 300 which may be used in accordance with some example embodiments. Similar to network 100 and network 200, network 300 includes a first UE 302 and a second UE 310 which are connected together by air interface 320, and where each UE has a separate connection to a PDN gateway 360. The first UE 302 includes connectivity circuitry 306 and the second UE 310 includes connectivity circuitry 312. UE 302 uses connectivity circuitry 306 to connect to PDN gateway 360 via air interface 322, access point 330, and ePDG/TWAG 350. The second UE 310 uses connectivity circuitry 312 to connect to PDN gateway 360 via air interface 324, access point 340, and ePDG/TWAG 355. When application 304 requests data from an outside network via PDN gateway 360, UE 302 may provide data via both a first connection using air interface 322 and a second connection using air interfaces 320 and 324. In certain embodiments, access point 330 and access point 340 may be the same access point. In such embodiments, performance improvements may be limited by connectivity circuitry 306 and 312 sharing bandwidth. In other embodiments, connectivity circuitry 306 and 312 may connect to the same access point 330, 340, but using different spectrum resources. For example, connectivity circuitry 306 may connect to the single access point 330, 340 using a 2.4 GHz spectrum and connectivity circuitry 312 may connect to the single access point 330, 340 using a 5 GHz spectrum.

Figure 4:
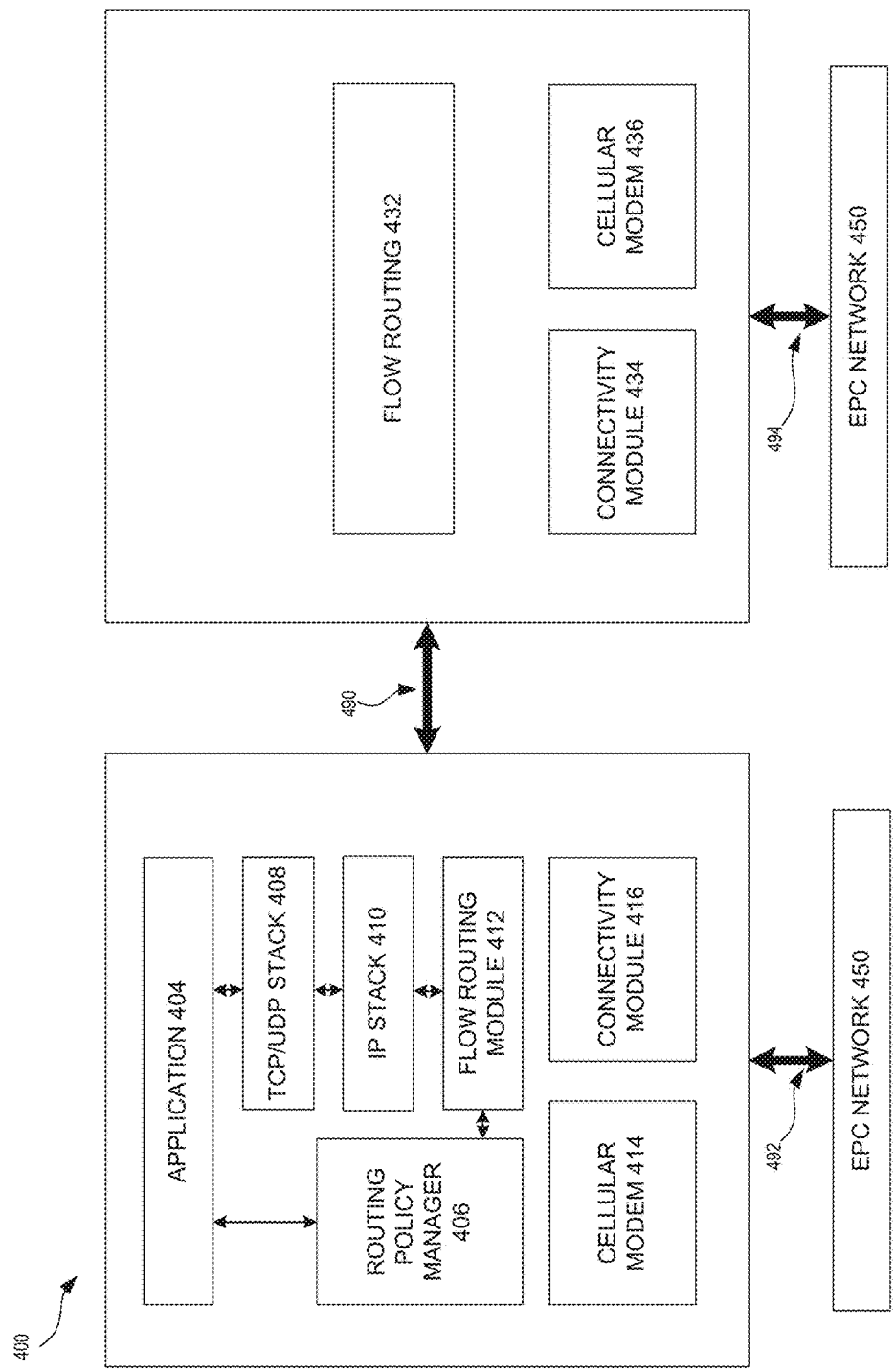
FIG. 4 illustrates a block diagram of a system including multiple devices which may be used together for link aggregation in accordance with some example embodiments.

FIG. 4 illustrates a block diagram of a system 400 including multiple devices which may be used together for link aggregation in accordance with some example embodiments. As illustrated, system 400 includes a host UE 402, a serving UE 420, and an evolved packet core (EPC) network 450. Host UE 402 and serving UE 420 are connected via air interface 490. Host UE 402 is connected to EPC network 450 via air interface 492, and serving UE 420 is connected to EPC network 450 via air interface 494. FIG. 4 represents an example embodiment of architecture to support link aggregation between multiple devices. An application 404 operating on host UE 402 can transmit data via a context shared between different cellular modems 414 and 436. As illustrated above in networks 100, 200, and 300, various embodiments may use combinations of cellular modems 414, 436 and other connectivity circuitry. Additionally, in various other embodiments, any combination of two or more devices may be used to aggregate connections, and devices used for such aggregation may further each provide one or more connections to a PDN gateway 360 of EPC network 450 in order to provide network access via a link aggregation to an application 404 operating on one of the UEs 404.

In various embodiments, a connection using air interface 490 may be based on any wireless or combination of wired and wireless technology, such as Bluetooth™, Wi-Fi direct, Wi-Fi via a local access point 130, any near field communication link, or any other such communication technology. Such a connection may be created to enable or disable link aggregation between the different UEs and to initiate PDN connection sharing. As part of such operation, host UE 402 may communicate a request for serving UE 420 to act as a serving device for an aggregated link. After accepting such a request in such embodiments, serving UE 420 interacts with a PDN gateway 360 to establish the corresponding portion of the aggregated link for serving UE 420. Messaging for the UE 404 to UE 420 connection may additionally include additional message formats directed to exchanging information related to the PDN connection sharing and any other messaging for device or network interworking to set up and operate the shared PDN connection as part of an aggregated link.

In various embodiments, messaging between host and serving UEs 402, 420 can be performed through EPC network 450. In such embodiments, host UE 402 may request a potential serving UE 420 via EPC network 450, with EPC network 450 handling the acceptance and establishment of the aggregated link. Such embodiments give EPC network 450 additional possibilities to control the aggregated link to avoid creating a device to device specific protocol that may cause errors in system operation.

When user application 404 uses network resources, transmission control protocol (TCP) uniform datagram protocol (UDP) stack 408 and internet protocol (IP) stack 410 operate to manage data directly to and from the user application 404. In other embodiments, other communication protocols may be used. Flow routing module 412 of UE 402 is then in charge of splitting the traffic coming from the application 404 and merging incoming data based on routing rules. The routing policy manager module 406 provides these routing rules for use by flow routing module 412. The policy provided by routing policy manger 406 can be configured by the user or may be provided by an EPC network 450 such as LTE network 230 when the host UE 402 initially makes a connection. In certain embodiments, the host UE 402 that establishes the connection is considered to "own" the PDN connection to a PDN gateway 360 of EPC network 450. Flow routing module 412 also aggregates the data received at cellular modem 414 from the first network path using air interface 492 and data received at connectivity module 416 from the second network path using air interfaces 490 and 494. In certain embodiments, flow routing module 412 may perform data re-ordering for data from the different network paths if needed.

In system 400, cellular modem 414 or UE 402 communicates a first portion of the data directly to and from the EPC network 450 as part of a first network path. Connectivity module 416 communicates a second portion of the data to and from the EPC network 450 via air interface 490 to UE 420 as part of a second network path. As described above, connectivity modules 416 and 434 may include circuitry for Wi-Fi connections, Bluetooth connections, or any other such connections between devices. During system 400 operation, the serving UE 420 relays data via a second path from connectivity module 434 to flow routing module 432, to cellular modem 436, to the network, and back. Flow routing module 432 of the serving UE 420, which is operating as a serving device, manages the sending of the second portion of the data to the appropriate PDN connection with EPC network 450. Flow routing module 432 also manages the relay of data received on this PDN connection from EPC network 450 to the host UE 402.

Figure 5:
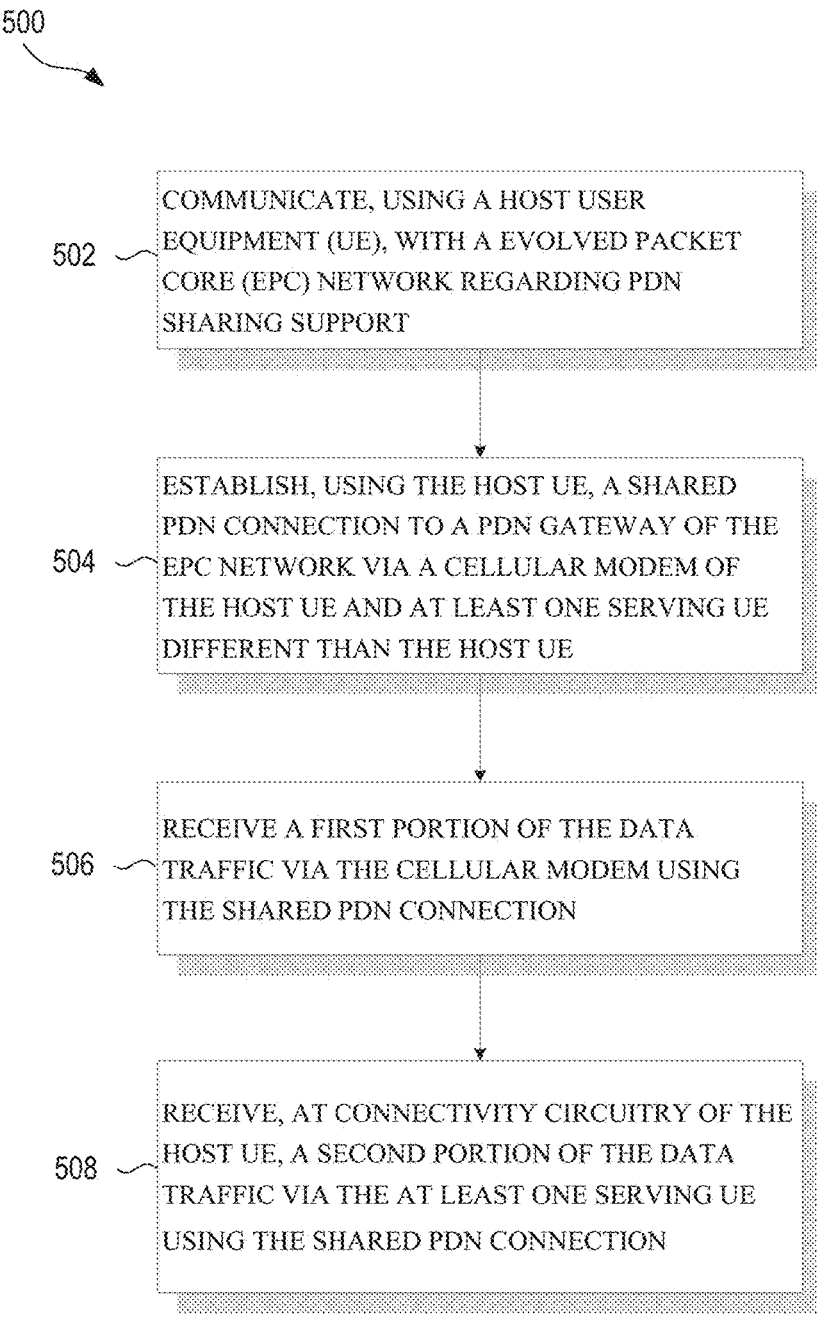
FIG. 5 illustrates aspects of a method for multi-device link aggregation according to some example embodiments.

FIG. 5 illustrates aspects of a method 500 for multi-device link aggregation according to some example embodiments. For the purposes of illustration, method 500 is described with respect to system 400. It will be apparent that, in other embodiments, different systems or network architectures may be used with embodiments such as method 500.

Method 500 begins with operation 502 communicating, by a host UE 402, with a evolved packet core (EPC) network 450 regarding PDN sharing support. While link aggregation, as described herein, is transparent to application 404 operating on host UE 402, network elements of EPC network 450 are configured to support link aggregation in various embodiments. FIGS. 7-10 illustrate aspects of support communication in various embodiments. In certain embodiments, the UE 402 notifies the EPC network 450 about the link aggregation capability of UE 402. EPC network 450 may then enable aggregation for the UE 402. In certain embodiments, the EPC network 450 may perform an authorization check, and forbid an unauthorized UE from using link aggregation. This authorization may be based on account settings, device or user profile registration, payment histories, current network usage status, or any other such setting. In certain embodiments, prior to the host UE 402 communicating with the EPC network 450, the EPC network 450 may notify the host UE 402 that multi-device link aggregation is supported by the EPC network 450. In certain embodiments, EPC network 450 may support or allow multi-device link aggregation globally, for specific links, or for specific types of use. For example, in certain embodiments, only LTE—S5 links or S2B links may be enabled in EPC network 450 for multi-device link aggregation.

Communications regarding multi device link aggregation may be performed using a variety of different methods within EPC network 450. In certain embodiments, enhancement of the capability indicator sent by a UE to the network during an LTE/PS attachment procedure may be used to communicate aggregation support. In certain embodiments, aggregation support may be signaled using an information element provided in the attachment message sent from EPC network 450 to host UE 402. In certain embodiments, a notification may be provided in a tracking area update message, once any UE participating in link aggregation is connected to host UE 402. In certain embodiments, a dedicated signaling message or signaling elegant may be created to notify the network of the PDN connection sharing support. Such a dedicated signaling message may additionally identify devices authorized for multi-device link aggregation. In certain embodiments, signaling may be provided during a PDN connection request as part of LTE messaging.

In certain such embodiments, the notification of link aggregation capability may be included only if the PDN connection is shared between multiple devices. When the PDN connection is not shared, a UE only solution is possible. For example, all Internet service transferred using a first application 404 may be done with a first device, and all voice traffic may be done with a link using a second device. In such embodiments, link aggregation may be transparent to the network and may be performed entirely by the participating UEs. For S2 B communication links, signaling may be done during a virtual private network (VPN) establishment in order to connect the UE to an ePDG 150 over Wi-Fi.

In various embodiments, an identity of one or more serving UEs, including serving UE 420, can be provided along with a signal from the network indicating that multi-device link aggregation is supported. In other embodiments, serving devices, including serving UE 420, may be identified by user inputs, account settings, or other such identifiers combined with local connection polling using connectivity module 416 of host UE 402. In embodiments where the network provides a list of serving UEs, the connection authorization may be provided with the identity of the serving UEs. In other embodiments, local authorization is performed to enable a connection between a host and a serving UE.

Operation 504 then involves establishing, using the host UE 402, a shared PDN connection to a PDN gateway 360 of the EPC network 450 via a cellular modem 414 of the host UE 402 and at least one serving UE 420 different than the host UE 402. In various embodiments, shared PDN connections are anchored in a PDN gateway 360 of EPC network 450. The PDN gateway 360 is the unit in charge of allocating the PDN resources. The PDN gateway 360 is reachable via multiple links and can allow aggregation of links between multiple devices where the links may be using the same or different technologies. If a PDN connection is shared between multiple devices, the PDN gateway 360 is in charge of allocation of a single IP address to all devices sharing the connection. In embodiments functioning in this manner, address translation when aggregating the traffic for multiple devices is avoided.

In certain embodiments, the host UE 402 initiates establishment of the PDN connection. With such a method, each collaborating device including the host UE 402 and the serving UE 420 initiates their own PDN connection in a shared mode to the PDN gateway 360 of EPC network 450. In certain embodiments, for the PDN gateway 360 to identify all collaborating devices, the identity of the host UE 402 can be provided by each collaborating device when the device's PDN connection is established. For example, when serving UE 420 communicates with EPC network 450 to establish the PDN connection for serving UE 420, this communication may include an identifier for host UE 402. In alternative embodiments, the identity of serving devices can be provided by host devices when the host device initiates the host devices PDN connection. In embodiments where more than two devices are being used for link aggregation, third, fourth, fifth, and any additional UEs may provide an identifier for any UE already having a PDN connection to the PDN gateway 360 as part of the aggregated link in order for the new UE to join the existing aggregated link. The PDN gateway 360, in such embodiments, then insures that a single IP address is allocated to all devices sharing the same PDN connection as part of link aggregation.

In other embodiments, the network may drive PDN establishment. In such embodiments, host UE 402 may initiate the PDN connection in the shared mode and provide the identity of all serving UEs 420 to EPC network 450. In other embodiments, authorized UEs, including the host UE 402 and any serving devices including serving UE 420, can be provisioned in a user profile stored in the EPC network 450. In such embodiments, the EPC network 450 may then derive, based on the stored user profile information, which UEs are available as serving UEs 420 for the host UE 402. The PDN gateway 360 can then trigger a PDN connection establishment for each UE identified as a serving UE 420 as part of an aggregated link, with each UE informed of the shared PDN connection between multiple devices as the individual links are established. In certain embodiments, an identifier for host UE 402 may be provided as serving UE 420 connections are established by the PDN gateway 360 to provide each serving UE 420 with an option to accept or reject the establishment of the shared PDN connection. In certain embodiments, a prefix or postfix may be added to an access point name (APN) as part of the establishment of the aggregated link. In certain LTE embodiments, a new PDN type or a new element in a PDN connection request may be added. In other embodiments, additional communications may be used to indicate that a system is operating with a shared aggregated link.

Operation 506 involves receiving a first portion of the data traffic via the cellular modem 414 using the shared PDN connection, and operation 508 involves receiving, at connectivity circuitry 416 of the host UE 402, a second portion of the data traffic via at least one serving UE 420 using the shared PDN connection. As mentioned above, in addition to selection of a PDN and various aspects of initial connection, flow routing module 412 may use information from routing policy manager module 406 to determine how information to and from application 404 is routed between connectivity circuitry 416 and cellular modem 414. The policies from routing policy manager module 406 used by flow routing module 412 may be based on various aspects, including: access point names (APNs) used by the aggregated link; a destination IP address, a transport protocol (e.g. TCP, UDP, etcetera); a source or destination port; an identified bandwidth for each available connection for each UE used in the aggregated link; a battery level of each UE; a power consumption of each UE; a congestion value for each link of each UE, a link quality value for each link of each UE; load balancing criteria configured by the operating network and associated PDN gateway 360; a latency of each available connection from a UE to a PDN gateway; and/or an application ID which may be used by various communication policy settings. In certain embodiments, every one of these criteria may be used for a policy. In other embodiments, additional criteria based on any system performance metric may be used for such policies. Additional details related to aspects various embodiments such as the embodiment of method 500, including multiple example details of methods for establishing a shared PDN connection, are discussed below.

Figure 6:
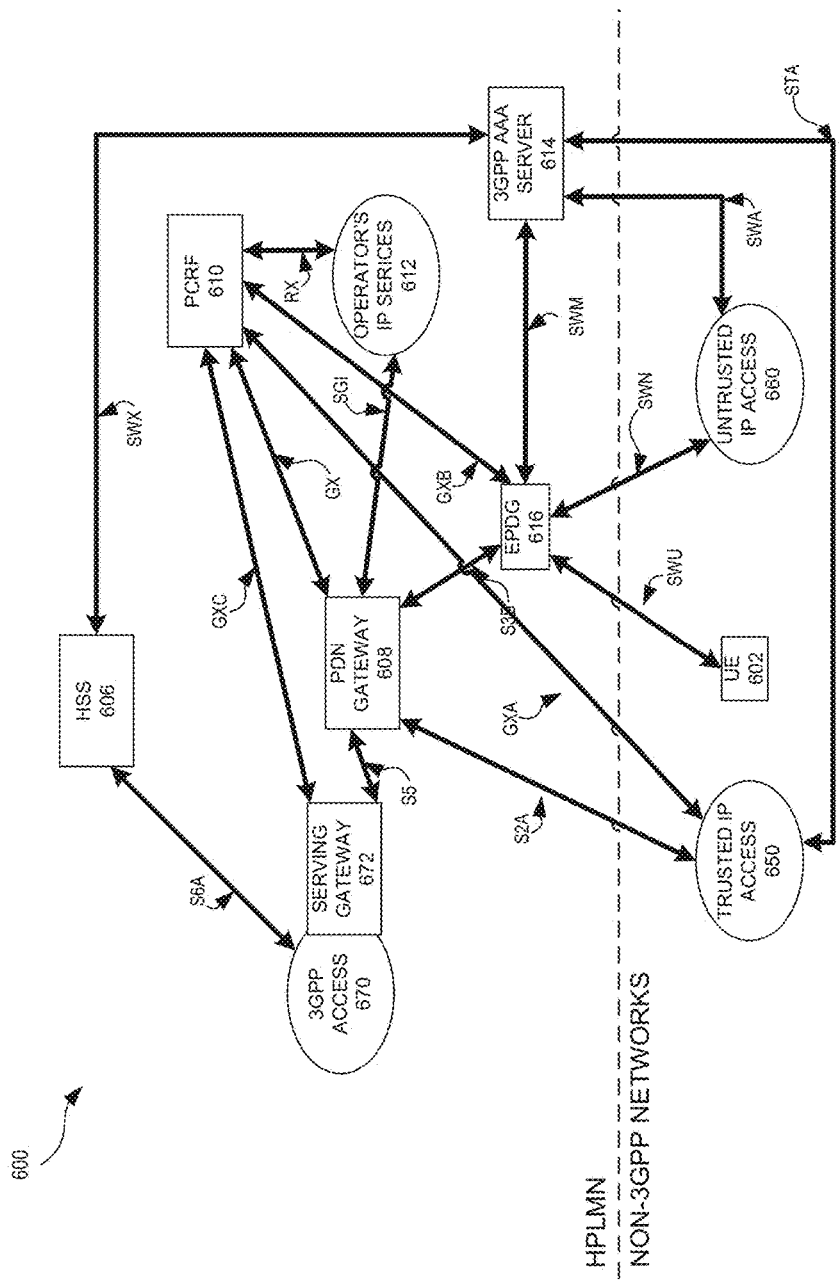
FIG. 6 illustrates aspects of a wireless network which may be used in accordance with some example embodiments.

FIG. 6 illustrates aspects of a wireless network 600 which may be used in accordance with some example embodiments. As shown, wireless network 600 illustrates aspects of an evolved packet service (EPS) network which provides communications with non-3GPP networks communicating with a UE 602. In certain embodiments, for example, an alternate method similar to method 500 may function using an EPS network similar to wireless network 600 in place of EPC network 450, with corresponding host and serving UEs utilizing connectivity circuitry 416 to connect to a PDN gateway 360 via an ePDG 150, similar to the network connection illustrated by network 100 showing connectivity circuitry 106 used to access PDN gateway 160 via air interface 122, access point 130, and ePDG 150.

The wireless network 600 provides UE entry points to the network at multiple points. A UE 602 may use 3GPP access 670 to enter the network using serving gateway 672 to access PDN gateway 608. A UE 602 may use trusted non-3GPP IP access 650 using, for example, a TWAG to access PDN gateway 608. A UE such as UE 602 may use an untrusted non-3GPP IP access 660 to access PDN gateway 608. Additionally, a UE 602 may access a network operator's IP services 612 such as instant messaging services (IMS), primary synchronization signals (PSS), or other such network operator communication structures.

Wireless network 600 shows home subscriber server (HSS) 606. In certain embodiments, HSS 606 is a central database that contains user-related and subscription-relation information for UEs 602 in the wireless network 600. HSS 606 provides mobility management, call and session establishment support, user authentication and access authentication. In certain embodiments, HSS 606 may communicate with a UE 602 to enable link aggregation based on subscription settings associated with UE 602.

3GPP authentication authorization accounting (AAA) server 614 operates in wireless network 600 to access information from HSS 606 to enable UE function on various elements of the wireless network 600. 3GPP AAA server 614 may also generate usage reports which are used to track UE usage and charges associated with UE access to various entry points and bandwidth usage from those points. Policy charging rules function (PCRF) server 610 may work with 3GPP AAA server 614 to integrate policy rules within a complex network, and may be integrated with or support various billing, rating, charging, or other functions along with any combination of standalone or integrated network management functions.

As described above, ePDG systems such as ePDG 616 operate to secure data transmissions with a UE 602 connected within a network over untrusted non-3GPP access. In various embodiments, then, ePDG 616 acts as a termination of an untrusted link to establish a trusted tunnel from PDN gateway 608 to a UE such as UE 602.

The various illustrated connections between the elements of wireless network 600, shown as S6a, SWx, Gxc, Gx, Rx, SGi, S6b, Gxb, SWn, SWa, STa, Gxa, S2a, S2b, and S5 are defined by 3GPP standards, including details for connections between home public land mobile network (HPLMN), and non-3GPP network access to a broader network via PDN gateway 608.

Figure 7:
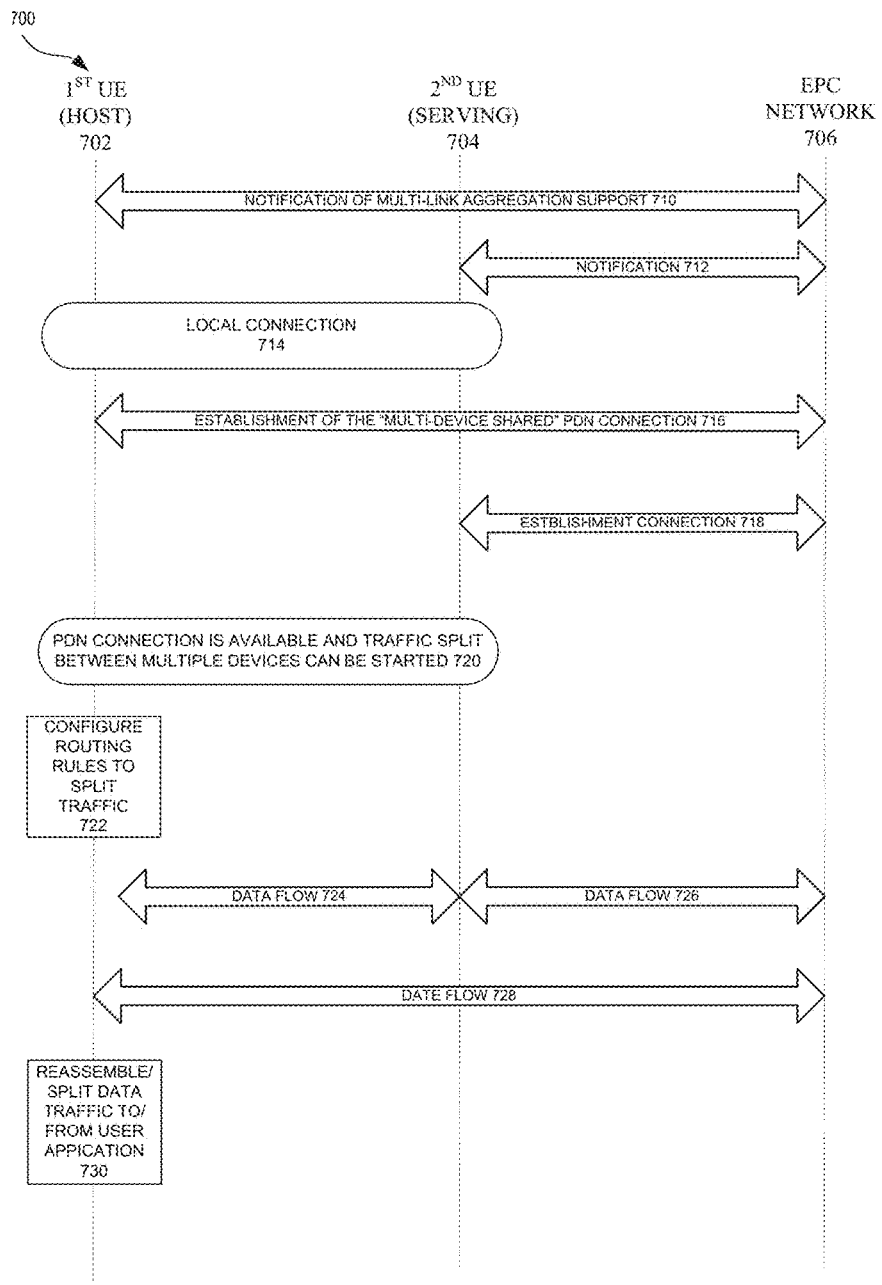
FIG. 7 illustrates aspects of data flow for multi-device link aggregation according to example embodiments.

FIG. 7 illustrates aspects of data flow for multi-device link aggregation according to example embodiments, illustrated as data flow 700. Data flow 700 illustrates communications between a first UE 702, a second UE 704, and an EPC network 706, according to one example embodiment. In operations 710 and 712, the EPC network 706 communicates with the first UE 702 and the second UE 704 in respective communications to provide notification of multi-link aggregation support. In operation 714, first UE 702 and second UE 704 establish a local connection. In certain embodiments, an agreement for link sharing with second UE 704 acting as a serving UE may be established as part of this local connection. In other embodiments, this agreement may be separately established via EPC network 706 prior to the local connection being established. In such network enabled embodiments, a request may be sent from the first UE 702 to the EPC network 706 and the request may be relayed from EPC network 706 to the second UE 704. A response confirmation may be returned from the second UE 704 to first UE 702 via the same route.

After the local connection is made in operation 714, the connection from each UE 702,704 to EPC network 706 is established in operations 716 and 718, with the individual links from each UE 702,704 structured as part of the multi-device shared PDN connection having a single IP address allocated by EPC network 706. In operation 720, second UE 704 and first UE 702 communicate to verify that the second UE 704 is configured to begin providing data as part of a shared PDN connection. In operation 722, the first UE 702 uses routing rules and flow routing modules 412 to manage split traffic as part of the multi-device shared PDN connection. Similarly, in some embodiments, certain routing decisions may be made by EPC network 706. During operation, data flow 700 in operation 728 is sent and received at the circuitry of the first UE 702 via a link to EPC network 706. During the same time period, data flow 700 in operations 724 and 726 is received at the first UE 702 and sent to EPC network 706 via second UE 704. In operation 730 data sent from first UE 702 is reassembled at EPC network 706, and data received at first UE 702 is reassembled locally and provided to an application 404 operating on first UE 702. The above operations thus represent one example embodiment to establish and operate a shared PDN connection. As mentioned above, during operation, additional UEs may be added to the shared PDN connection described here using similar messaging. Embodiments where messaging and flow control is provided in part or in whole by EPC network 706 may provide the network with additional flexibility to optimize and control the use of available resources and the option to add additional devices into a single shared IP address aggregated link.

Figure 8:
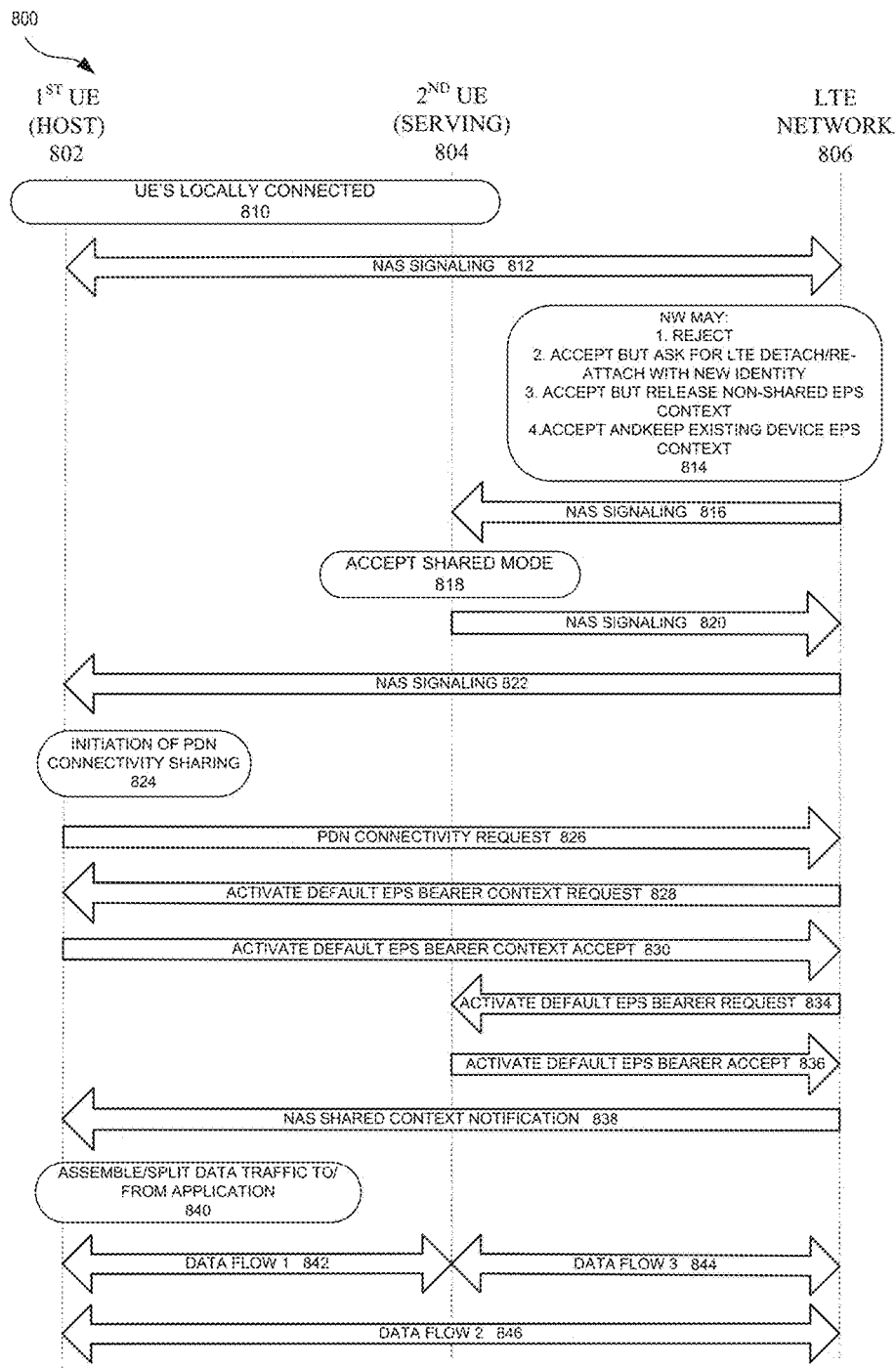
FIG. 8 illustrates aspects of data flow for multi-device link aggregation according to example embodiments.
Figure 9:
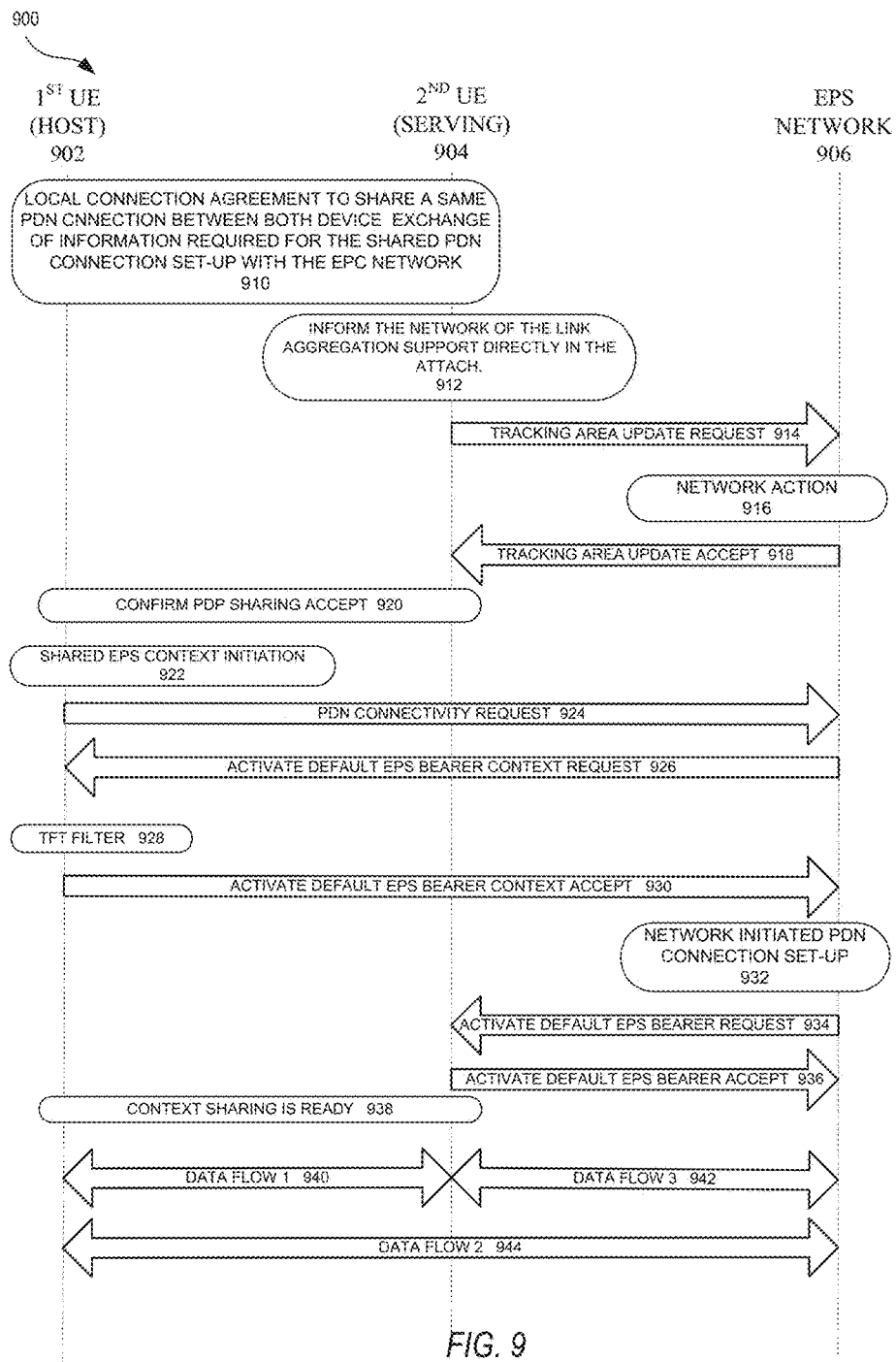
FIG. 9 illustrates aspects of data flow for multi-device link aggregation according to example embodiments.

FIGS. 8 and 9 then describe additional data flow diagrams for additional embodiments using LTE non-access stratum (NAS) protocols. FIG. 8 illustrates aspects of data flow for multi-device link aggregation according to example embodiments, illustrated as data flow 800. Data flow 800 particularly describes an embodiment for network assisted establishment of an aggregated link, with a first UE 802 acting as a host device and a second UE 804 acting as a serving device for a shared connection to LTE network 806. In operation 810, first UE 802 and second UE 804 establish a local connection. In operation 812, NAS signaling communicates a request for an aggregated link. This may comprise a packet data protocol (PDP) share mode request identifying two devices. Other embodiments may use different communications.

In operation 814, in response to the NAS signaling of operation 812, LTE network 806 may reject the request, accept but ask for the first UE 802 to detach and reattach to LTE network 806 with a new identity, accept the request but release non-shared EPS contexts, or accept the request and keep existing EPS contexts for the first UE 802.

If operation 814 does not involve a rejection, operation 816 follows with additional NAS signaling. Certain such embodiments may comprise a PDP share mode request asking the second UE 804 to acting as a service device for the first UE 802. If the request is rejected, then the operation ceases. LTE network 806 may attempt to identify an alternate UE to act as a serving device, or may respond to the signaling of operation 812 by communicating that no UE is available for sharing. If the request is accepted in operation 818, then operations 820 and 822 involve NAS signaling for confirmation. This may involve PDP share mode confirm communications. In operation 824, the first UE 802 initiates PDN connectivity sharing, and in operation 826, a PDN connectivity request is communicated to LTE network 806 operating in PDN shared mode. In operation 828, LTE network 806 responds with a communication to activate a default evolved packet system (EPS) bearer context request, and in operation 830, the first UE 802 responds to this communication. In certain embodiments, a filter such as a traffic flow template (TFT) filter may be structured to specify flow sharing between any UE involved in the shared connection. For example, "destportX to device, destportY to device B", and so on, may be used following operation 828. In operations 834 and 836, similar activate default EPS bearer context request communications may be sent from LTE network 806 to second UE 804 and back.

In operation 838, a NAS shared context notification is communicated from LTE network 806 to the first UE 802 indicating that the second UE 804 is connected as part of the shared PDN connection with a single IP address. In operations 840, 842, 844, and 846, the data flow 800 and provision of data to an application 404 operating on the first UE 802 proceeds as described in the alternate embodiments detailed above.

FIG. 9 illustrates aspects of data flow for multi-device link aggregation according to example embodiments, illustrated as data flow 900. Data flow 900 describes an embodiment operating within an embodiment similar to the one described above for data flow 700, but where a host device is explicitly requesting a network to enable context sharing with a serving device. Such embodiments may provide more flexibility for the network to control which devices may be added and removed for operation of an aggregated link using a single PDN connection and IP address. Data flow 900 is illustrated using a first host UE 902 and a serving second UE 904 configured for an aggregated link with EPS network 906.

In operation 910, a local connection is established between UEs 902 and 904. In the embodiment of FIG. 9, this connection is used with an agreement to share a single PDN connection. Any exchange of information not previously performed that is needed for a sharing agreement may be performed during operation 910. In operation 912, second UE 904 may initiate an action to inform the EPS network 906 of the link aggregation support, and in operation 914, second UE 904 may inform EPS network 906 with a tracking area update (TAU) communication when connected to the first UE 902. This may be sent, in certain embodiments, with a PDP share mode communication for one device. In other embodiments, other communications from second UE 904 to EPS network 906 may be used to inform EPS network 906 of the link aggregation support prior to the local connection with the first UE 902 being established. In operation 916, a network action similar to the network action of operation 814 may be taken.

For any action of operation 916 that does not reject the request of operation 914, a tracking area update acceptance communication is sent in operation 918. In operation 920, the second UE 904 confirms acceptance of the PDP sharing acceptance. In operation 922, the first UE 902 initiates the shared EPS context. This may be performed by providing an identifier associated with second UE 904 to the EPS network 906. In certain embodiments, additional details may be included as part of this messaging, such as desired load sharing indicating a preference for certain link usage in the aggregated link. Operation 924 involves communication of a PDN connectivity request, and operation 926 involves a response to activate a default EPS bearer context request. Just as described above, TFT filters may optionally be used in operation 928. In operation 930, a communication to accept and activate default EPS bearer context is sent in response to the communication of operation 926.

In operation 932, EPS network 906 initiates the PDN connection setup for the second UE 904 with subsequent activation requests and responses in operations 934 and 936. If multiple serving devices are to be used, this may also occur for other serving UEs. In various embodiments with multiple serving devices, a PDN connection for an additional serving device to be included in the aggregated link may occur at any possible time during operation of the aggregated link.

In operation 938, second UE 904 informs the first UE 902 that context sharing as part of the aggregated link is ready using the local connection. In operations 940, 942, 944, and 946, use of the aggregated link proceeds as described in any embodiment discussed above.

Figure 10:
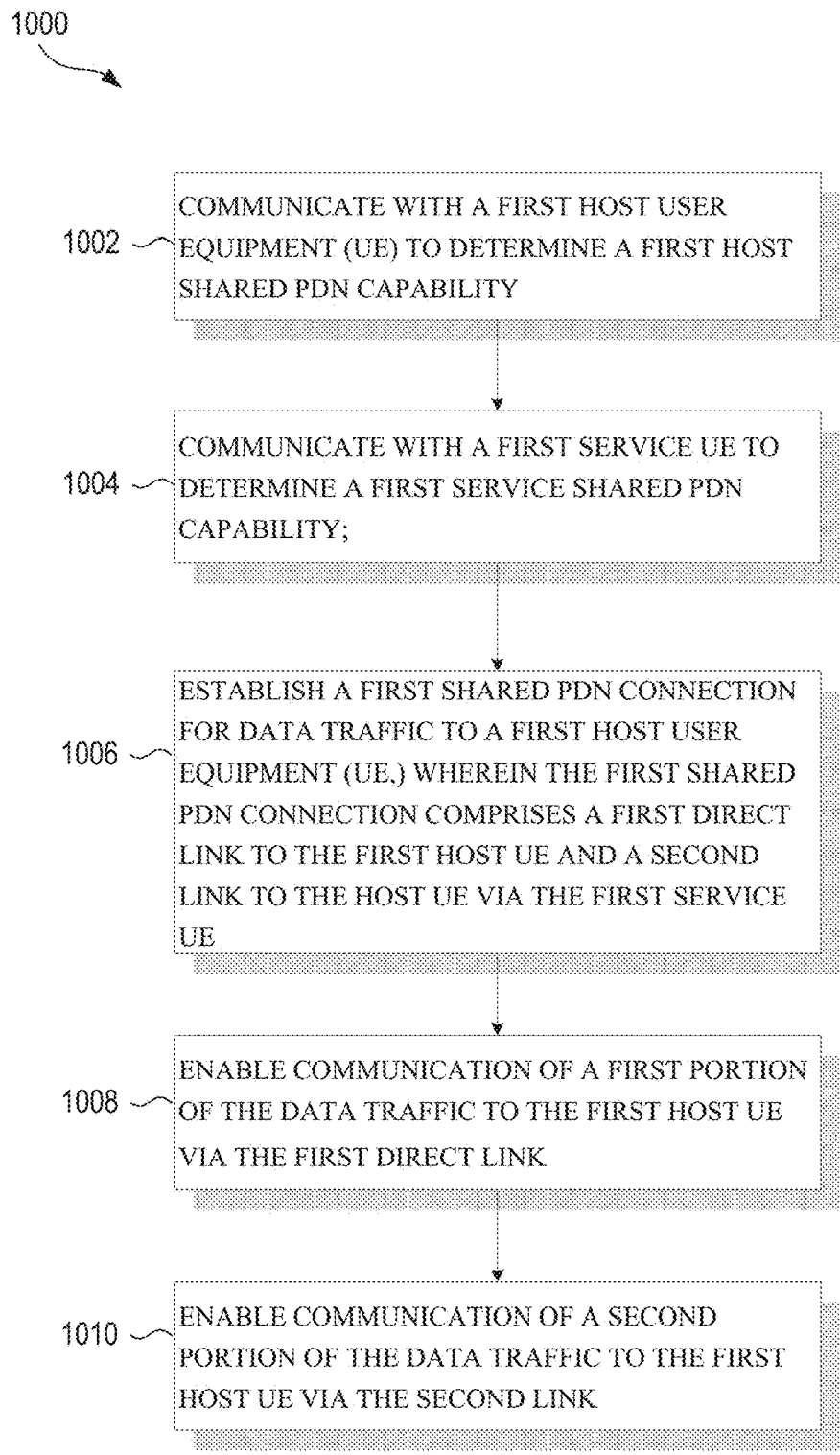
FIG. 10 illustrates aspects of a method for multi-device link aggregation according to some example embodiments.

FIG. 10 illustrates aspects of a method for multi-device link aggregation according to some example embodiments, illustrated as method 1000. Method 1000 may be performed by any PDN gateway 608 for shared PDN connections described herein, including PDN gateways 160, 260, and 360. Additionally, just as LTE network 230 is illustrated with PDN gateway 260, any EPS network 906 or LTE network 806 described herein may include or be connected to a PDN gateway 260 as described herein. Method 1000 is a method performed by circuitry of such a PDN gateway 260 configured to perform the operations of method 1000.

Operation 1002 of method 1000 involves the PDN gateway 260 communicating with a first host UE 902 to determine a first host shared PDN capability. Operation 1004 involves the PDN gateway 260 communicating with a first serving UE to determine a first service shared PDN capability. Operation 1006 involves the PDN gateway 260 establishing a first shared PDN connection for data traffic to a first host UE 902, where the first shared PDN connection comprises a first direct link to the first host UE 902 and a second link to the host UE 902 via the second serving UE 904. Operation 1008 involves enabling communication of a first portion of the data traffic to the first host UE 902 via the first direct link. An example of such a first direct link comprises links from host devices to an associated network as illustrated by the data flow 700, 800, 900 of operations 728, 846, and 944. Operation 1010 involves enabling communication of a second portion of the data traffic to the first host UE 902 via the second link. Examples of such second links include the multi-step data flow operations 724 and 726 of FIGS. 7, 842 and 844 of FIG. 8, and 940 and 942 of FIG. 9.

Figure 11:
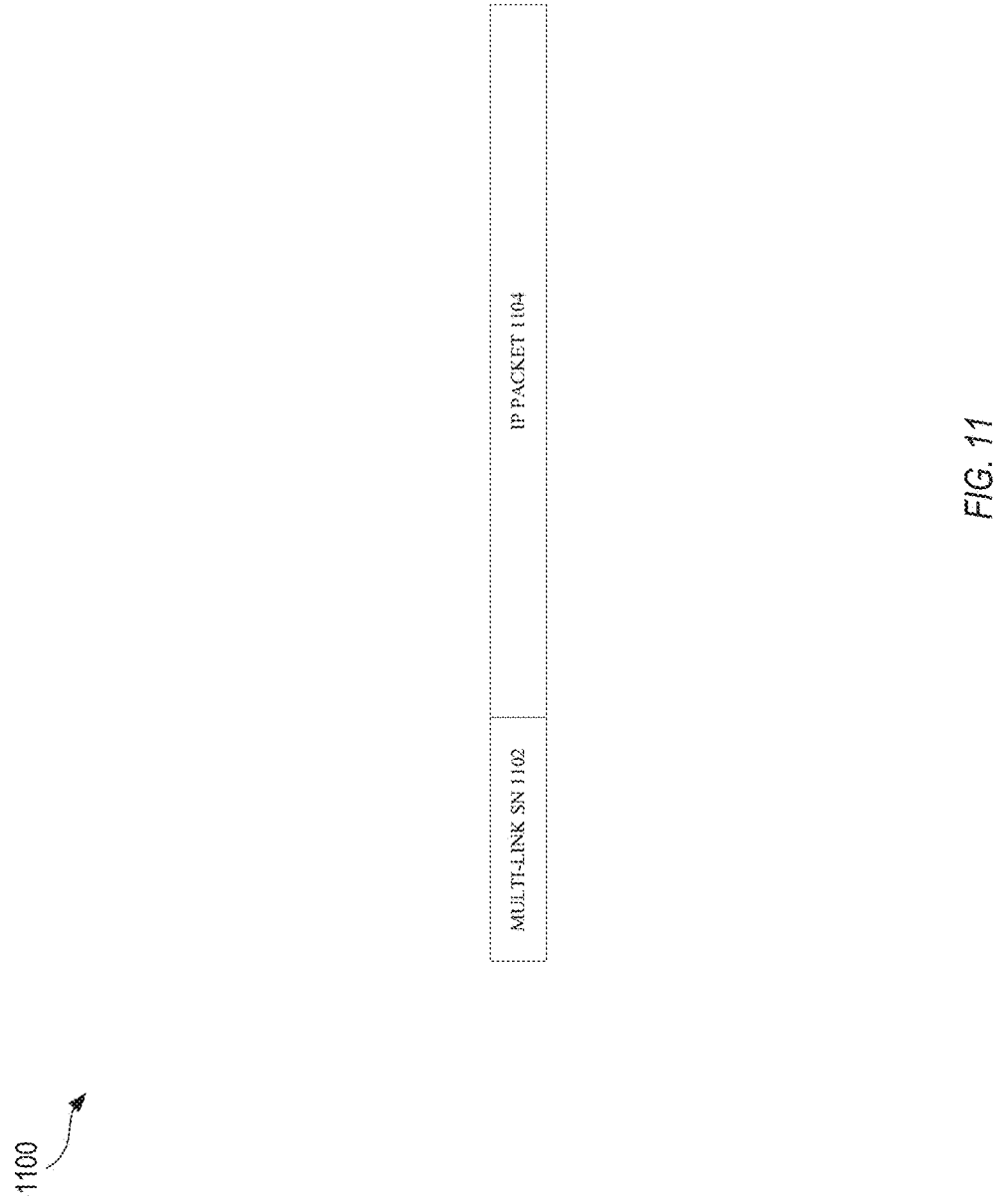
FIG. 11 illustrates aspects of multi-device link aggregation according to some example embodiments.
Figure 12:
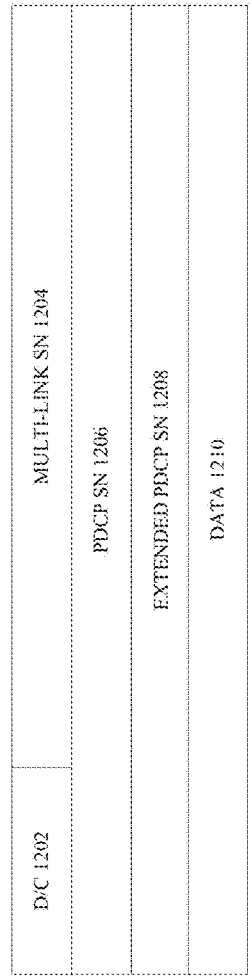
FIG. 12 illustrates aspects of multi-device link aggregation according to some example embodiments.

FIG. 11 illustrates aspects of multi-device link aggregation, according to some example embodiments, by showing example data structure 1100. FIG. 12 illustrates aspects multi-device link aggregation according to some example embodiments by showing example data structure 1200. As described above, if an application such as application 104 or application 404 is sensitive to the in-sequence delivery of the IP data and the re-ordering is not handled in the transport layer, various embodiments may reorder the data. This data reordering is performed before delivering the data to the application 404 when the IP data flow is received at a host UE 902 from multiple links as described above. Data structures 1100 and 1200 each use a multi-link sequence number to enable such reordering. In such embodiments, the sequence number is common to all links that are aggregated. The sequence number is set by the host device for the outgoing traffic, with the host device managing the reordering for the traffic from different links before sending the data to the IP stack, as illustrated by flow routing module 412 and IP stack 410. In various embodiments, the usage of such re-ordering functionality and multi-link sequencing may be enabled or disabled during PDN connection establishment. For cellular connections, packet data convergence protocol (PDCP) layer messaging may be enhanced, in certain embodiments, to add the multi-link sequence number. Just as above, such a multi-link sequence number enables in-sequence delivery of data transmitted over different links of an aggregated link described herein where a single PDN connection and IP address is shared.

Data structure 1200 shows a modified PDCP protocol data unit (PDU) with an added multi-link SN 1204. This multi-link SN 1204 is added to decompression/compression (D/C) element 1202, PDCP SN 1206, extended PDCP SN 1208, and data 1210. The example PDP data PDU shown as data structure 1200 is defined to add the second sequence number as multi-link SN 1204 for reordering of data transferred via multiple devices in addition to the PDCP SN 1206 and extended PDCP SN 1208. Such embodiments enable backward compatibility to the existing structure and provide a method to add the multi-link SN 1204 to existing layer 2 protocols.

Data structure 1100 illustrates a simple addition of multi-link sequencing number (SN) 1102 to IP packet 1104 to enable a flow routing module such as flow routing module 412 to order data 1210. When a first UE 902 is sending data 1210 to another device sharing the PDN connection, a sharing sequence number can simply be appended to the IP data. This may be done, in certain embodiments, using an implementation specific protocol. In other embodiments, an IPv6 header extension may be used for the sequencing number. In certain such embodiments, the host UE 902 determines and provides the multi-link sequence number 1102 to the serving device. The serving device then provides the multi-link sequence number 1102 to the layer 2 protocol when transmitting the data 1210 to the network, where the network (e.g. a PDN gateway 260 of the network) may use the sequence number for data ordering. In such embodiments, the serving device similarly receives a sequence number from the network with data 1210 for the host device, and provides the IP data received from the network along with the corresponding multi-link sequence number 1102 to the host device. The host device then uses the multi-link sequence number 1102 to reorder the data 1210 received from different links of the aggregated link used with a single PDN connection.

Figure 13:
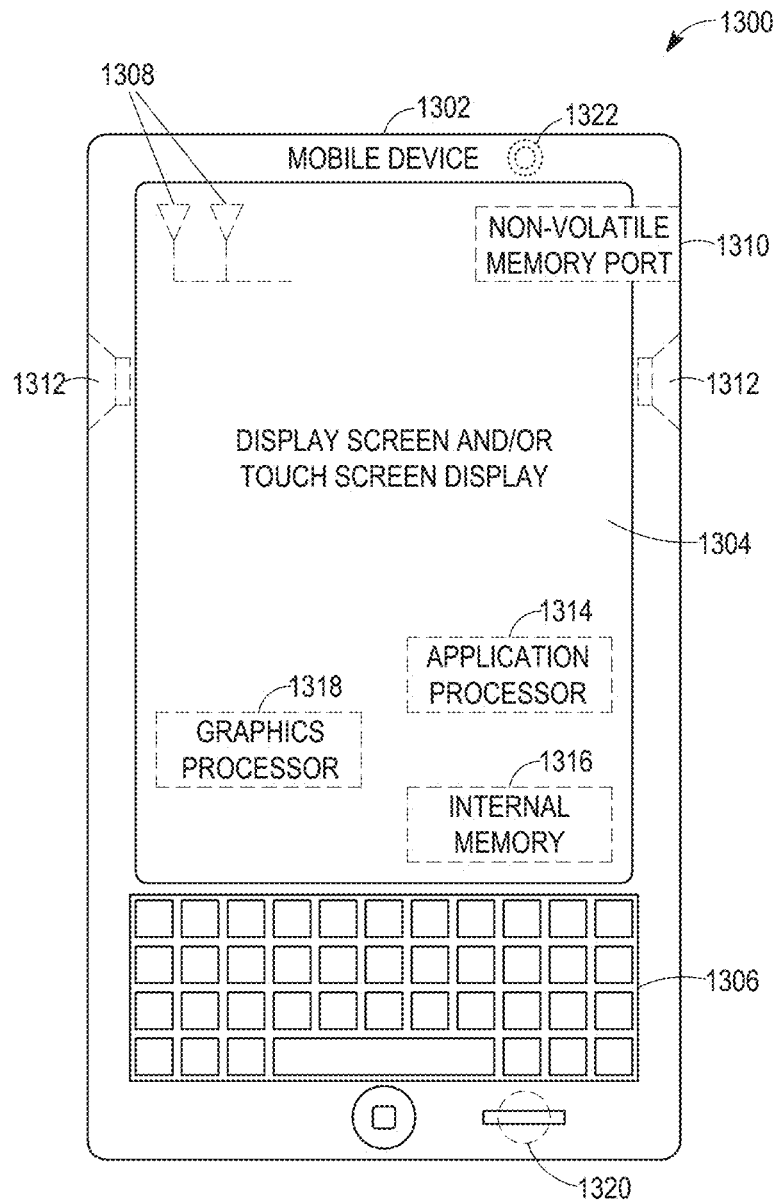
FIG. 13 illustrates an example UE which may be used in accordance with some embodiments.

FIG. 13 illustrates an example of a UE illustrated as UE 1300. The UE 1300 can include one or more antennas 1308 within housing 1302 that are configured to communicate with a hotspot, base station (BS), an eNB 140, or other type of wireless local area network (WLAN) or wireless wide area network (WWAN) access point. UE may thus communicate with a WAN such as the Internet via an eNB, access point, or other such base station transceiver. UE 1300 can be configured to communicate using multiple wireless communication standards, including standards selected from 3GPP LTE, WiMAX, High Speed Packet Access (HSPA), Bluetooth, and Wi-Fi standard definitions. The UE 1300 can communicate using separate antennas 1308 for each wireless communication standard or shared antennas 1308 for multiple wireless communication standards.

FIG. 13 also shows a microphone 1320 and one or more speakers 1312 that can be used for audio input and output from the UE 1300. A display screen 1304 can be a liquid crystal display (LCD) screen, or other type of display screen such as an organic light emitting diode (OLED) display. The display screen 1304 can be configured as a touch screen. The touch screen can use capacitive, resistive, or another type of touch screen technology. An application processor 1314 and a graphics processor 1318 can be coupled to internal memory 1316 to provide processing and display capabilities. A non-volatile memory port 1310 can also be used to provide data input/output options to a user. The non-volatile memory port 1310 can also be used to expand the memory capabilities of the UE 1300. A keyboard 1306 can be integrated with the UE 1300 or wirelessly connected to the UE 1300 to provide additional user input. A virtual keyboard can also be provided using the touch screen. A camera 1322 located on the front (display screen) side or the rear side of the UE 1300 can also be integrated into the housing 1302 of the UE 1300. Any such elements may be used to generate information that may be communicated via aggregated links as described in various embodiments herein.

Figure 14:
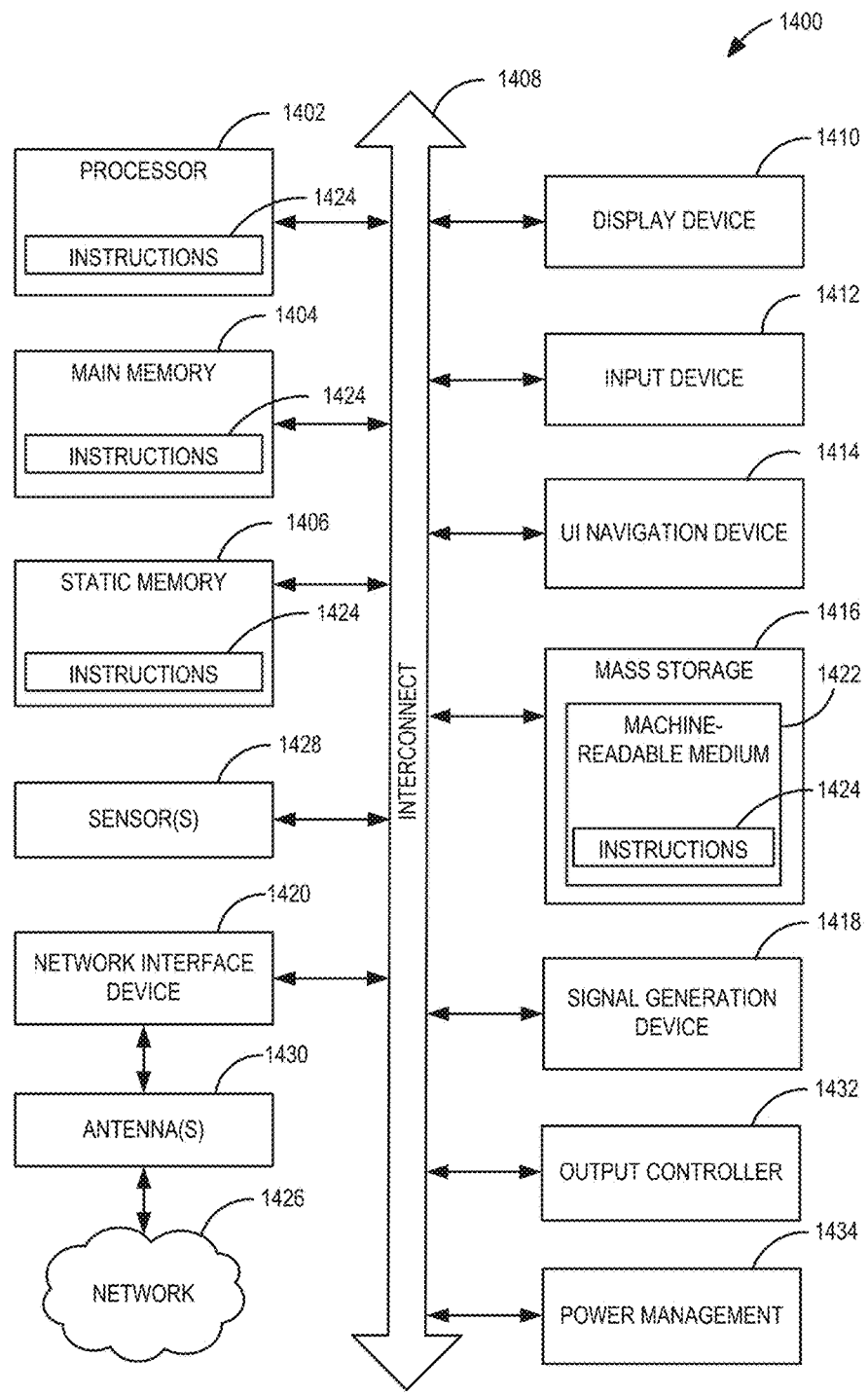
FIG. 14 is a block diagram illustrating an example computer system upon which any one or more of the methodologies herein discussed can be run, in accordance with some embodiments.

FIG. 14 illustrates a block diagram of a device that may be used to implement various aspects of systems, devices, and methods for modifying cell measurements based on device mobility according to some embodiments. FIG. 14 illustrates an example computer system machine 1400 upon which any one or more of the methodologies herein discussed can be run, including PDN gateways 160, 260, 360, access points 130, 330, 340, eNB 140, any UE described herein, any network element or server described herein, or any other such device described herein. In various alternative embodiments, the machine 1400 operates as a standalone device or can be connected (e.g., networked) to other machines. In a networked deployment, the machine 1400 can operate in the capacity of either a server or a client machine in server-client network environments, or it can act as a peer machine in peer-to-peer (or distributed) network environments. The machine can be a personal computer (PC) that may or may not be portable (e.g., a notebook or a netbook), a tablet, a set-top box (STB), a gaming console, a personal digital assistant (PDA), a mobile telephone or smartphone, a web appliance, a network router, switch or bridge, or any machine capable of executing instructions (sequential or otherwise) that specify actions to be taken by that machine 1400. Further, while only a single machine 1400 is illustrated, the term "machine" shall also be taken to include any collection of machines 1400 that individually or jointly execute a set (or multiple sets) of instructions to perform any one or more of the methodologies discussed herein.

Example computer system machine 1400 includes a processor 1402 (e.g., a central processing unit (CPU), a graphics processing unit (GPU) or both), a main memory 1404 and a static memory 1406, which communicate with each other via an interconnect 1408 (e.g., a link, a bus, etc.). The computer system machine 1400 can further include a video display device 1410, an alphanumeric input device 1412 (e.g., a keyboard), and a user interface (UI) navigation device 1414 (e.g., a mouse). In one embodiment, the video display device 1410, input device 1412 and UI navigation device 1414 are a touch screen display. The computer system machine 1400 can additionally include a mass storage device 1416 (e.g., a drive unit), a signal generation device 1418 (e.g., a speaker), an output controller 1432, a power management controller 1434, and a network interface device 1420 (which can include or operably communicate with one or more antennas 1430, transceivers, or other wireless communications hardware), and one or more sensors 1428, such as a Global Positioning System (GPS) sensor, compass, location sensor, accelerometer, or other sensor.

The storage device 1416 includes a machine-readable medium 1422 on which is stored one or more sets of data structures 1100, 1200 and instructions 1424 (e.g., software) embodying or utilized by any one or more of the methodologies or functions described herein. The instructions 1424 can also reside, completely or at least partially, within the main memory 1404, static memory 1406, and/or within the processor 1402 during execution thereof by the computer system machine 1400, with the main memory 1404, static memory 1406, and the processor 1402 also constituting machine-readable media 1422.

While the machine-readable medium 1422 is illustrated in an example embodiment to be a single medium, the term "machine-readable medium" can include a single medium or multiple media (e.g., a centralized or distributed database, and/or associated caches and servers) that store the one or more instructions 1424. The term "machine-readable medium" shall also be taken to include any tangible medium that is capable of storing, encoding or carrying instructions 1424 for execution by the machine and that cause the machine to perform any one or more of the methodologies of the present disclosure or that is capable of storing, encoding or carrying data structures 1100, 1200 utilized by or associated with such instructions 1424.

The instructions 1424 can further be transmitted or received over a communications network 1426 using a transmission medium via the network interface device 1420 utilizing any one of a number of well-known transfer protocols (e.g., hypertext transport protocol (HTTP)). The term "transmission medium" shall be taken to include any intangible medium that is capable of storing, encoding, or carrying instructions 1424 for execution by the machine 1400, and includes digital or analog communications signals or other intangible medium to facilitate communication of such software.

Various techniques, or certain aspects or portions thereof may take the form of program code (i.e., instructions 1424) embodied in tangible media, such as floppy diskettes, CD-ROMs, hard drives, non-transitory computer readable storage medium, or any other machine-readable storage medium 1422 wherein, when the program code is loaded into and executed by a machine 1400, such as a computer, the machine 1400 becomes an apparatus for practicing the various techniques. In the case of program code execution on programmable computers, the computing device may include a processor 1402, a storage medium readable by the processor 1402 (including volatile and non-volatile memory and/or storage elements), at least one input device 1412, and at least one output device. The volatile and non-volatile memory and/or storage elements may be a RAM, EPROM, flash drive, optical drive, magnetic hard drive, or other medium for storing electronic data 1210. The base station and mobile station may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Various embodiments may use 3GPP LTE/LTE-A, IEEE 1402.11, near field communication, and Bluetooth communication standards. Various alternative embodiments may use a variety of other WWAN, WLAN, and WPAN protocols and standards can be used in connection with the techniques described herein. These standards include, but are not limited to, other standards from 3GPP (e.g., HSPA+, UMTS), IEEE 1402.16 (e.g., 1402.16p), or Bluetooth (e.g., Bluetooth 13.0, or like standards defined by the Bluetooth Special Interest Group) standards families. Other applicable network configurations can be included within the scope of the presently described communication networks. It will be understood that communications on such communication networks can be facilitated using any number of personal area networks, LANs, and WANs, using any combination of wired or wireless transmission mediums.

The embodiments described above can be implemented in one or a combination of hardware, firmware, and software. Various methods or techniques, or certain aspects or portions thereof, can take the form of program code (i.e., instructions 1424) embodied in tangible media, such as flash memory, hard drives, portable storage devices, read-only memory (ROM), random-access memory (RAM), semiconductor memory devices (e.g., electrically programmable read-only memory (EPROM), electrically erasable programmable read-only memory (EEPROM)), magnetic disk storage media, optical storage media, and any other machine-readable storage medium or storage device 1416 wherein, when the program code is loaded into and executed by a machine 1400, such as a computer or networking device, the machine 1400 becomes an apparatus for practicing the various techniques.

A machine-readable storage medium or other storage device 1416 can include any non-transitory mechanism for storing information in a form readable by a machine 1400 (e.g., a computer). In the case of program code executing on programmable computers, the computing device can include a processor 1402, a storage medium readable by the processor 1402 (including volatile and non-volatile memory and/or storage elements), at least one input device 1412, and at least one output device. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

It should be understood that the functional units or capabilities described in this specification can have been referred to or labeled as components or modules, in order to more particularly emphasize their implementation independence. For example, a component or module can be implemented as a hardware circuit comprising custom very-large-scale integration (VLSI) circuits or gate arrays, off-the-shelf semiconductors such as logic chips, transistors, or other discrete components. A component or module can also be implemented in programmable hardware devices such as field programmable gate arrays, programmable array logic, programmable logic devices, or the like. Components or modules can also be implemented in software for execution by various types of processors 1402. An identified component or module of executable code can, for instance, comprise one or more physical or logical blocks of computer instructions 1424, which can, for instance, be organized as an object, procedure, or function. Nevertheless, the executables of an identified component or module need not be physically located together, but can comprise disparate instructions 1424 stored in different locations which, when joined logically together, comprise the component or module and achieve the stated purpose for the component or module.

Indeed, a component or module of executable code can be a single instruction 1424, or many instructions 1424, and can even be distributed over several different code segments, among different programs, and across several memory devices. Similarly, operational data can be identified and illustrated herein within components or modules, and can be embodied in any suitable form and organized within any suitable type of data structure 1100, 1200. The operational data can be collected as a single data set, or can be distributed over different locations including over different storage devices 1416, and can exist, at least partially, merely as electronic signals on a system or network. The components or modules can be passive or active, including agents operable to perform desired functions.

Additional examples of the presently described method, system, and device embodiments include the following, non-limiting configurations. Each of the following non-limiting examples can stand on its own, or can be combined in any permutation or combination with any one or more of the other examples provided below or throughout the present disclosure.

What is claimed is:

1. User equipment (UE) for a shared packet data network (PDN) connection, the UE comprising:
   flow routing circuitry configured to:
   initiate a connection to a PDN gateway;
   communicate to the PDN gateway that the UE has a shared PDN capability to initiate transmission of data traffic via multiple different communication paths established by the PDN gateway as part of a shared PDN connection using a second UE;
communicate to the PDN gateway an identifier of the UE as a host device configured to receive network traffic via the shared PDN connection;
communicate to the PDN gateway a second identity of the second UE as a serving device configured to communicate network traffic to the host device as part of the shared PDN connection;
manage communication of the data traffic via the multiple different communication paths as part of the shared PDN connection to a PDN gateway;
a cellular modem configured to communicate a first portion of the data traffic with the PDN gateway as part of the shared PDN connection; and
connectivity circuitry separate from the cellular modem and configured to communicate a second portion of the data traffic with the PDN gateway via the second UE, wherein the second portion of the data traffic is different than the first portion of the data traffic.

2. The UE of claim 1 wherein the flow routing circuitry is further configured to receive a first internet protocol (IP) address assignment from the PDN gateway, wherein the first IP address is assigned to both the UE and the second UE by the PDN gateway.

3. The UE of claim 1 wherein the flow routing circuitry is further configured to identify a third UE as a second serving device configured to communicate network traffic to the host device as part of the shared PDN connection; and
wherein the connectivity circuitry is further configured to communicate a third portion of the data traffic with the PDN gateway via the third UE, wherein the third portion of the data traffic is different than the first and the second portions of the data traffic.

4. The UE of claim 1 wherein the flow routing circuitry is further configured to route first data traffic from a first application of the UE based on a set of policy data stored in a memory of the UE.

5. The UE of claim 4 wherein the set of policy data is based on one or more of:
an access point name (APN);
a destination IP address;
a transport protocol;
a source port;
a destination port;
a bandwidth associated with each device used for the shared PDN connection;
a latency of each link from the UE to the PDN gateway;
a power consumption associated with each device used for the shared PDN connection;
a congestion value associated with each device used for the shared PDN connection;
a link quality associated with each device used for the shared PDN connection;
a load balancing criteria configured by the PDN gateway; and
an application identifier for the first application.

6. The UE of claim 1 wherein the flow routing circuitry manages outgoing data traffic and incoming data traffic, and wherein the flow routing circuitry is further configured to add a sequence number to each outgoing portion of the data traffic on the shared PDN connection.

7. The UE of claim 6 wherein the sequence number for each outgoing portion of the data traffic is added as a sequence number in a packet data convergence protocol (PDCP) data unit (PDU).

8. The UE of claim 1 wherein the connectivity circuitry comprises circuitry configured for a Bluetooth connection to the second UE.

9. The UE of claim 1 wherein the connectivity circuitry comprises circuitry configured for a Wi-Fi connection to the second UE.

10. The UE of claim 9 wherein the second portion of the data traffic is configured to be communicated on the shared PDN connection via a long term evolution (LTE) cellular modem of the second UE.

11. The UE of claim 9 wherein the second portion of the data traffic is configured to be communicated on the shared PDN connection using a non-third generation partnership project (3GPP) access connection of the second UE.

12. The UE of claim 1 wherein the flow routing circuitry is further configured to:
route a second portion of second data traffic using a second shared PDN connection, wherein the second portion of the second data traffic is routed to a third UE via the cellular modem and the connectivity circuitry to deliver the second portion of the second data traffic to the third UE.

13. The UE of claim 12 wherein the flow routing circuitry is further configured to join the second shared PDN connection by communicating an identifier associated with the third UE to the PDN gateway.

14. The UE of claim 12 wherein the flow routing circuitry is further configured to join the second shared PDN connection in response to a PDN gateway issued request to join the second shared PDN connection.

15. The UE of claim 14 wherein the PDN gateway issued request is communicated using a network based user profile associated with the third UE.

16. The UE of claim 1 wherein the first data traffic is associated with a first application operating on the UE, and wherein the second data traffic is associated with a second application operating on the UE.

17. The UE of claim 1 further comprising one or more antennas coupled to the connectivity circuitry, wherein the data traffic is communicated via the one or more antennas.

18. A method for communication of data traffic using a shared PDN connection, the method comprising:
communicating, by a host user equipment (UE) with a evolved packet core (EPC) network, a communication regarding PDN sharing support to establish that the UE has a shared PDN capability;
communicate to the PDN gateway an identifier of the UE as a host device configured to receive network traffic via the shared PDN connection;
communicate to the PDN gateway a second identity of the second UE as a serving device configured to communicate network traffic to the host device as part of the shared PDN connection;
establishing a shared PDN connection to a PDN gateway of the EPC network via a cellular modem of the host UE and at least one serving UE different than the host UE, wherein the shared PDN connection is established by the PDN gateway in response to the communication regarding PDN sharing support to establish that the at least one serving UE has a shared PDN capability;
receiving a first portion of the data traffic via the cellular modem using the shared PDN connection;
receiving, at connectivity circuitry of the host UE that is separate from the cellular modem, a second portion of the data traffic via the at least one serving UE using the shared PDN connection.

19. The method of claim 18 further comprising:
assembling, using flow circuitry of the host UE, the first portion of the data traffic and the second portion of the data traffic into a first assembled data traffic; and
communicating, from the flow circuitry of the host UE to an application of the first UE, the first assembled data traffic.

20. The method of claim 18 further comprising:
establishing a local connection between the host UE and the serving UE using the connectivity circuitry of the host UE prior to establishing the shared PDN connection.

21. A non-transitory computer readable medium comprising computer readable instructions that, when executed by a processor, cause a first user equipment (UE) comprising the processor to:
communicate with a PDN gateway to establish that the UE has a service shared PDN capability;
initiate a shared packet data network (PDN) connection to the PDN gateway in response to the communication with the PDN gateway establishing that the UE has the service shared PDN capability, wherein the shared PDN connection to the PDN gateway comprises a first link via a cellular modem of the first UE and a second link via communication circuitry separate from the cellular modem of the first UE to a second UE different than the first UE, and wherein the first link and the second link are established by the PDN gateway;
communicate to the PDN gateway an identifier of the UE as a host device configured to receive network traffic via the shared PDN connection;
communicate to the PDN gateway a second identity of the second UE as a serving device configured to communicate network traffic to the host device as part of the shared PDN connection; and
transmit data traffic using the shared PDN by transmitting a first portion of the data traffic via the cellular modem to the PDN gateway and by transmitting a second portion of the data traffic via the communication circuitry and the second UE to the PDN gateway.

22. The non-transitory computer readable medium of claim 21 wherein the instructions further cause the UE to initiate a local connection to the second UE prior to establishing the shared PDN connection.

23. The non-transitory computer readable medium of claim 21 wherein the instructions further cause the UE to receive a communication input via a touchscreen device of the UE; and
initiate the local connection and the shared PDN connection in response to the communication input.

24. A packet data network (PDN) gateway for shared PDN connections comprising circuitry configured to:
communicate with a first host user equipment (UE) to determine a first host shared PDN capability;
communicate with a first serving UE to determine a first service shared PDN capability;
establish a first shared PDN connection for data traffic to a first host user equipment (UE,) wherein the first shared PDN connection comprises a first direct link to the first host UE and a second link to the host UE via the first service;
enable communication of a first portion of the data traffic to the first host UE via the first direct link; and
enable communication of a second portion of the data traffic to the first host UE via the second link.

25. The PDN gateway of claim 24 further configured to assign a first internet protocol address to the first host UE and the first serving UE;
wherein the first direct link comprises an evolved node B and a first serving gateway; and
wherein the second link comprises an evolved packet data gateway (ePDG) and a second serving gateway.

26. The PDN gateway of claim 25 wherein the PDN gateway is further connected to an authentication authorization accounting (AAA) server which accesses information from a home subscriber server (HSS) to enable UE function, and wherein the PDN gateway is further connected to a policy charging rules function (PCRF) server which operates with the AAA server to integrate policy rules from a network with the PDN gateway.

27. The UE of claim 1 wherein the UE wherein the UE is further connected to a home subscriber server (HSS), wherein the HSS is coupled to an authentication authorization accounting (AAA) server to enable UE function, and wherein the UE is connected via the PDN gateway to a policy charging rules function (PCRF) server which operates with the AAA server to integrate policy rules from a network with the PDN gateway.

* * * * *